UNITED STATES PATENT OFFICE.

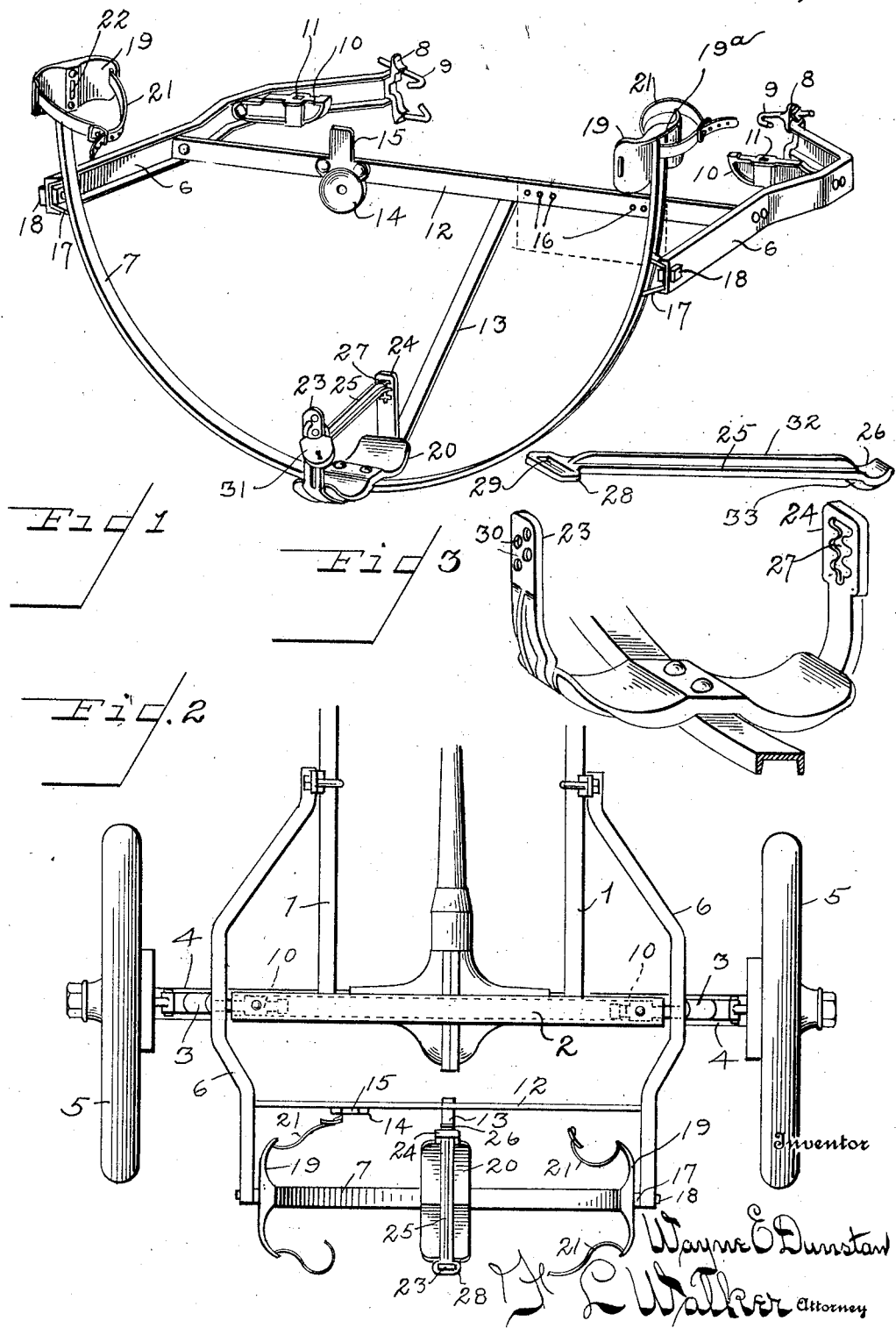

WAYNE E. DUNSTAN, OF DAYTON, OHIO, ASSIGNOR TO ROBERT HAGEN, OF DAYTON, OHIO.

TIRE-CARRIER FOR VEHICLES.

1,343,964.   Specification of Letters Patent.   Patented June 22, 1920.

Application filed February 26, 1919. Serial No. 279,378.

*To all whom it may concern:*

Be it known that I, WAYNE E. DUNSTAN, a citizen of the United States, residing at Dayton; in the county of Montgomery and State of Ohio, have invented certain new and useful Improvements in Tire - Carriers for Vehicles, of which the following is a specification.

My invention relates to motor vehicles, and particularly to a tire carrier or rack for spare tires adapted to be connected to the rear of the vehicle chassis.

The object of the invention is to simplify the structure, as well as the means and mode of operation of such tire carriers, whereby they will not only be cheapened in construction but will be more efficient in use, easily applicable to existing vehicles and unlikely to get out of repair.

A further object of the invention is to provide improved means for locking the tires in the rack, or holder, to prevent accidental loss or unauthorized removal of the tires, and to further provide such locking means which will be adjustable to accommodate tires of different sizes.

Inasmuch as the tire carrier, or rack forming the subject matter hereof is attached to the rear of the vehicle where it might obscure the usual tail light and license number, a further object of the invention is to provide means upon the tire carrier, or rack for effectively displaying both the tail lamp and the license tag.

With the above primary and other incidental objects in view, as will more fully appear in the specification, the invention consists of the features of construction, the parts and combinations thereof and the mode of operation or their equivalents, as hereinafter described and set forth in the claims.

In the drawings Figure 1 is a perspective view of the tire carrier or rack forming the subject matter hereof, detached from the vehicle. Fig. 2 is a top plan view of the rear portion of the vehicle chassis of the Ford type to which the rack or carrier has been applied. Fig. 3 is a detail perspective view of the tire locking means.

Like parts are indicated by similar characters of reference throughout the several views.

While the tire rack or carrier herein described is especially designed for application to Ford motor vehicles, the features of improvement hereafter described and set forth, when employed in conjunction with suitable means of attachment, are also capable of application to other motor vehicles than those of the Ford construction. It is to be therefore understood that the invention is not limited in its application to motor vehicles of this type, although it may be found most desirable for use upon machines of this character.

Referring to the drawings, and particularly Fig. 2, 1—1 are the side frame bars, or longerons of the vehicle chassis which are connected at their rear ends to the transverse body bolster 2, which in the Ford construction is supported upon the rear transverse springs 3, which are in turn mounted upon the rear axle 4, supported by the rear carrying and drive wheels 5 of the vehicle. The chassis side bars 1 are usually formed from channel iron having their recessed faces turned inward. The body bolster 2 is likewise channel shaped, the recessed face of which is turned downward.

The tire rack, or carrier forming the subject matter hereof, is rigidly mounted upon the vehicle chassis and comprises two outward bowed side arms 6, preferably, though not necessarily, formed from channel iron, which arms 6 project rearward of the vehicle body, a semi-circular bar 7, also preferably, though not necessarily, formed of channel iron, upon which the tire engaging means is mounted. The side bars 6 are provided with heads 8, at their forward end, in which are adjustably mounted hook bolts 9, which are adapted to engage over the inturned flanges of the chassis side bars 1. By the adjustment of the hook bolts 9, the side bars 6 of the carrier are firmly clamped to the chassis longerons 1. In spaced relation with the terminal heads 8, of the side bars 6, and projecting inward from said bars, are short arms, or spuds riveted, or otherwise secured to the side bars 6, and adapted to project within the inverted channel of the body bolster 2, to which the arms or spuds are firmly attached by means of body bolts extending through the bolster and through suitable openings 11 in said arms or spuds. The side bars 6 of the rack, or carrier, at points beyond the rear end of the vehicle chassis, and intermediate the arms or spuds 10 and the arcuate tire supporting bar 7, are interconnected one with the other by a transverse tie bar 12, rigidly attached at either end by riveting, or otherwise, to said side bars 6. Extending downwardly and rearwardly from the transverse tie bar 12, to the tire supporting bar 7, is a brace bar 13. Attached to the transverse tie bar 12 is a tail lamp support comprising a perforated disk light head, slightly concave on its rear face, from which projects upward a flat rectangular extension 15. There are different types of tail lamps commonly employed upon Ford vehicles, or other automobiles of similar type, one form of lamp being adapted to be engaged with the disk head 14, while the other style of lamp is adapted for engagement with the upright rectangular extension 15, of the lamp bracket. Thus the lamp bracket as described, embodying the circular head suitable for one style of lamp and the rectangular extension necessary for the other style of lamp, becomes universal in its adaptability. The transverse tie bar 12 is further provided with a series of holes 16 variously arranged in said bar to facilitate the attachment of the license number tag. For convenience of attachment of the side bars 6 with the arcuate tire supporting bar 7, there are provided arch shaped brackets 17, the extremities of which are attached by welding, riveting, or otherwise, within the channel of the arcuate bar 7, while the crowns of such bracket members 17 fit within the channel of the side bars 6, to which they are attached by bolts 18.

Fixedly mounted upon the arcuate supporting bars 7 are tire engaging pallets, or pads 19 and 20. The pallets 19 are riveted to the upturned ends of the arcuate bar 7, which project above the level of the side arms 6. The pallets 19 are provided on their upper edges with an outwardly turned flange 19ª, beneath which the end of the arcuate channel bar 7 abuts. The flange 19ª thus affords a finished appearance and serves to conceal the end of the arcuate channel bar 7. The pallets 19 are provided with slots, adjacent to their ends, through which are threaded straps 21 to be buckled around the tires supported in the rack, or holder. In addition to the slots 20 located at the ends of the pallets 19, these pallets are preferably, though not necessarily, provided with a medial slot 22, which extends not only through the pallet 19 but also the end of the channel bar 7, through which the strap 21 may be engaged, as shown at the right in Fig. 1, in the event that only a single tire is to be carried. As shown in Fig. 1, the pallets 19 and 20 are of a double arcuate form adapted to carry two standard tires. It is obvious that these pallets might be extended to such extent as to include a greater number of tires without modifying or changing the remainder of the structure. The mere extension of the length of the pallet being within the skill of any mechanic, has not been illustrated in the drawing.

The double curved pallet 20 at the bottom of the arcuate supporting bar 7, instead of being provided with slots for an attachment strap, such as are the pallets 19, is provided with two oppositely disposed upright arms 23 and 24, rigidly attached to the opposite ends of the double curved pallet 20. The arm 24 is provided with a series of transverse slots or eyes, which in the drawing have been shown interconnected to form a single opening having a series of oppositely disposed lateral ramifications. A locking bar 25 is provided, one end of which is curved as at 26, for engagement in any of the horizontal or laterally disposed ramifications of the opening 27, in the arms 24. The opposite end of the locking bar 25, is provided with a head 28 having therein a slot 29, through which the arm 23 is adapted to extend. The arm 23 is provided with a series of holes 30, in any one of which may be engaged a padlock 31, to prevent the disengagement of the locking bar 25 from the arm 23. It will be understood that in the event the tires to be carried are of large size, the locking bar 25 will be engaged with the arm 24, by thrusting the curved end 26 of said bar into the opening 27, in an elevated position. Likewise if the tires are of small size, the end 26 of the bar 25 will be engaged in a lower position in the opening 27, of the arm 24. Having engaged the locking bar 25 with the arm 24, in the particular ramification or lateral indentation of the opening 27, corresponding to the size of the tires to be carried, the slotted head of the bar 25 is then engaged over the protruding end of the arm 23, and locked in position by a padlock 31 engaged in the lowest hole 30, exposed above the slotted head of the locking bar. The curved end 26 of the locking bar cannot be disengaged from the arm 24, either accidentally, or otherwise, without first disengaging the slotted head of said locking bar from the arm 23, and this can be accomplished only by the removal of the padlock 31. This construction affords a convenient, adjustable locking device adaptable to tires of different sizes. For the purpose of strengthing the locking bar, it is provided with a longitudinal rib 32 on the upper face, and a second rib 33 on the under side, adjacent to the curved end 26, the latter rib being accommodated in the opening 27 by the vertical extensions of the slot which connect the lateral indentations or ramifications thereof.

From the above description it will be apparent that there is thus provided a device of the character described, possessing the particular features of advantage before enumerated as desirable but which obviously, is susceptible of modification in its form, proportions, detail construction or arrangement of parts, without departing from the principle involved or sacrificing any of its advantages.

While in order to comply with the statute, the invention has been described in language more or less specific as to structural features, it is to be understood that the invention is not limited to the specific details shown, but that the means and construction herein described and shown, comprise but one of several modes of putting the invention into effect, and the invention is therefore claimed in any of its forms or modifications within the legitimate and valid scope of the appended claims.

Having thus described my invention I claim:

1. A tire carrier for application to a vehicle chassis having side bars and a transverse body bolster, comprising two oppositely disposed outwardly bowed side arms, attachment means at the extremities of said arms by which the arms may be attached to the side bars of a vehicle chassis, spuds projecting inward from the bowed side arms at medial points thereof and adapted for engagement with the transverse body bolster of the vehicle chassis, a semi-circular supporting bar connecting the rearward ends of the side arms, and tire engaging members carried by the supporting bar.

2. A tire carrier for application to a vehicle chassis having side bars and a transverse body bolster, comprising side arms, means for attaching the side arms to the side bars of the vehicle chassis at their forward ends, means for attaching the side arms to the transverse body bolster of the vehicle chassis at their medial points, an arcuate supporting bar connecting the rearward ends of the side arms, and tire engaging means carried thereby.

3. A tire carrier for application to a vehicle chassis having channeled side bars and a transverse channeled body bolster, including side arms, hook bolts carried at the forward ends of the side arms for engagement with the channeled side bars of the chassis frame, spuds carried by the side arms adapted to project within the channeled recess of the transverse bolster, an arcuate supporting bar connecting the rearward ends of the side arms, and tire engaging members carried by said bar.

4. A tire carrier including an arcuate supporting bar, means for connecting the supporting bar with the chassis of a vehicle, tire engaging pallets carried by the said supporting bar, oppositely disposed arms fixedly connected with one of said pallets, and a separable locking bar adapted to be engaged with said arms at different positions throughout their length.

5. A tire carrier including an arcuate supporting bar, means for connecting the supporting bar with the chassis of a vehicle, tire engaging pallets carried by the said supporting bar, arms projecting substantially parallel from one of said pallets, a separable locking bar, one of the arms having therein a series of recesses in any one of which the locking bar may be engaged, said locking bar having an opening therein through which the other arm extends, substantially as specified.

6. A tire carrier including an arcuate supporting bar, means for connecting the supporting bar with the chassis of a vehicle, tire engaging pallets carried by the said supporting bar, arms projecting substantially parallel from one of said pallets, one of said arms having therein a slot provided with a plurality of lateral ramifications, a locking bar having a curved extremity adapted to be engaged in any of the several lateral ramifications of the slot, and means for locking the opposite end of the bar in engagement with the opposite arm at different points throughout the length thereof.

7. A tire carrier for application to a vehicle chassis having side bars and a transverse body bolster, including a tire supporting rack having laterally disposed side arms, means for connecting said side arms to the side bars of the chassis at points removed from the tire supporting rack, and means for connecting the side arms with the body bolster at points intermediate their connections with the side bars and the tire rack, substantially as specified.

8. A tire carrier comprising a rack, a tire supporting pallet thereon, fixed arms carried by the structure and extending on opposite sides of the tire carried thereon, a transverse locking bar detachable from said arms, and means for locking said detachable bar in engagement with said arms at different points throughout their length to accommodate the structure to tires of different sizes, substantially as specified.

In testimony whereof, I have hereunto set my hand this 13th day of February A. D. 1919.

WAYNE E. DUNSTAN.

Witnesses:
E. E. DUNCAN,
M. E. HOLDERFIELD.